United States Patent
Sato et al.

(10) Patent No.: US 8,690,380 B2
(45) Date of Patent: Apr. 8, 2014

(54) SURFACE ILLUMINATION METHOD USING POINT LIGHT SOURCE, LINEAR LIGHT SOURCE DEVICE, AND SURFACE ILLUMINATION DEVICE USING LINEAR LIGHT SOURCE DEVICE

(75) Inventors: Eiichi Sato, Hachioji (JP); Hiroyasu Sato, Hachioji (JP); Ken Sato, Hachioji (JP)

(73) Assignee: Opto Design, Inc. (JP)

(*) Notice: Subject to any disclaimer, the term of this patent is extended or adjusted under 35 U.S.C. 154(b) by 197 days.

(21) Appl. No.: 13/393,933

(22) PCT Filed: Sep. 10, 2010

(86) PCT No.: PCT/JP2010/065630
§ 371 (c)(1),
(2), (4) Date: Mar. 2, 2012

(87) PCT Pub. No.: WO2011/030856
PCT Pub. Date: Mar. 17, 2011

(65) Prior Publication Data
US 2012/0155071 A1  Jun. 21, 2012

(30) Foreign Application Priority Data
Sep. 11, 2009  (JP) .................. 2009-211131

(51) Int. Cl.
*F21V 7/00* (2006.01)
*F21V 21/00* (2006.01)

(52) U.S. Cl.
USPC ............... 362/217.05; 362/97.3; 362/249.02; 362/611; 362/612

(58) Field of Classification Search
USPC ............... 362/97.3, 217.05, 249.02, 611, 612
See application file for complete search history.

(56) References Cited

U.S. PATENT DOCUMENTS 6,474,826 B1  11/2002  Tanaka et al.
7,229,199 B2 *  6/2007  Lee et al. ................. 362/561

(Continued)

FOREIGN PATENT DOCUMENTS

CA  2488494 A1  12/2003
CN  1678865 A  10/2005

(Continued)

OTHER PUBLICATIONS

"International Application Serial No. PCT/JP2010/065630, International Search Report mailed Oct. 26, 2010", (w/ English Translation), 13 pgs.

(Continued)

*Primary Examiner* — Stephen F Husar
*Assistant Examiner* — James Cranson, Jr.
(74) *Attorney, Agent, or Firm* — Schwegman, Lundberg & Woessner, P.A.

(57) ABSTRACT

A surface illumination device includes: a point light source I having high directionality; a linear light conversion unit II that converts light from the point light source into linear light; a linear light diffusion unit III that diffuses the linear light; and a surface lighting unit IV that is irradiated with diffused light and outputs surface light. The light from the point light source I is converted into the linear light by the linear light conversion unit II. The linear light thus converted is diffused in a predetermined direction by the linear light diffusion unit III. The diffused light is radiated on the surface lighting unit IV to be converted into surface light and radiated.

10 Claims, 13 Drawing Sheets

(56) References Cited

U.S. PATENT DOCUMENTS

| | | | |
|---|---|---|---|
| 7,726,828 B2 | 6/2010 | Sato | |
| 7,819,542 B2 | 10/2010 | Sato | |
| 8,272,772 B2 * | 9/2012 | Sato et al. | 362/609 |
| 8,573,823 B2 * | 11/2013 | Dau et al. | 362/560 |
| 2005/0111236 A1 | 5/2005 | Hulse | |
| 2005/0138852 A1 | 6/2005 | Yamauchi | |
| 2009/0003002 A1 | 1/2009 | Sato | |

FOREIGN PATENT DOCUMENTS

| | | |
|---|---|---|
| CN | 101375095 A | 2/2009 |
| DE | 60316569 T2 | 7/2008 |
| IL | 165971 | 6/2010 |
| JP | 2001-236811 A | 8/2001 |
| JP | 2002-202739 A | 7/2002 |
| JP | 2003-081011 A | 3/2003 |
| JP | 2004-6317 A | 1/2004 |
| JP | 2005-099406 A | 4/2005 |
| JP | 2005-149848 A | 6/2005 |
| JP | 2005-529457 A | 9/2005 |
| JP | 2008-027886 A | 2/2008 |
| JP | 2008-53069 A | 3/2008 |
| JP | 2008-226636 A | 9/2008 |
| JP | 2008-300222 A | 12/2008 |
| JP | 2009-4307 A | 1/2009 |
| JP | 2009-110977 A | 5/2009 |
| KR | 10-2008-0099281 A | 11/2008 |
| KR | 10-2009-0061682 A | 6/2009 |
| WO | WO-03/104712 A2 | 12/2003 |
| WO | WO-2007086347 A1 | 8/2007 |

OTHER PUBLICATIONS

"International Application Serial No. PCT/JP2010/065630, International Preliminary Report on Patentability mailed Apr. 19, 2012", 7 pgs.

"International Application Serial No. PCT/JP2010/065630, Written Opinion mailed Oct. 26 2010", 3 pgs.

* cited by examiner

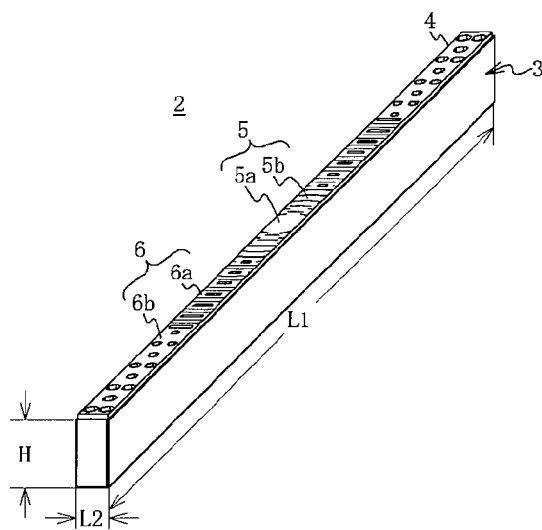
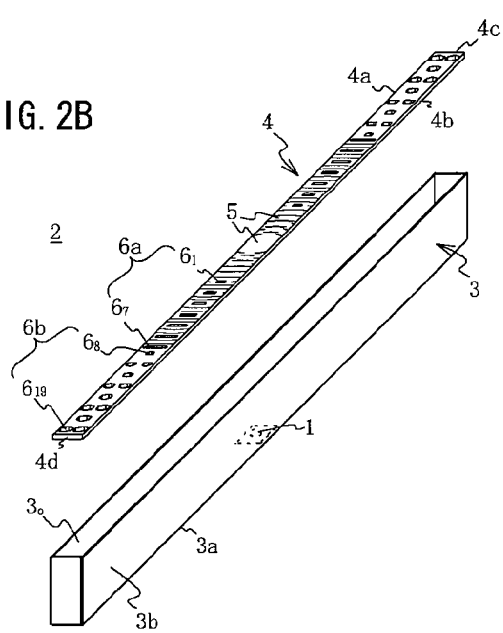

SURFACE ILLUMINATION METHOD USING POINT LIGHT SOURCE, LINEAR LIGHT SOURCE DEVICE, AND SURFACE ILLUMINATION DEVICE USING LINEAR LIGHT SOURCE DEVICE

RELATED APPLICATIONS

This application is a nationalization under 35 U.S.C. 371 of PCT/JP2010/065630, filed Sep. 10, 2010, and published as WO 2011/030856 A1 on Mar. 17, 2011, which claims priority to Japanese Patent Application Serial No. 2009-211131, filed Sep. 11, 2009, which applications and publication are incorporated herein by reference in their entirety.

TECHNICAL FIELD

The present invention relates to a surface illumination method using a point light source, a light source device, and a surface illumination device using the light source device. More particularly, the invention relates to a surface illumination method of converting light from a point light source into linear light, then converting the linear light into surface light, and radiating the surface light, to a light source device that converts the light from the point light source into the linear light and radiates the linear light, and to a surface illumination device using the light source device.

BACKGROUND ART

In recent years, instead of a conventionally used fluorescent light and the like, a light emitting diode (hereinafter referred to as LED) and a laser diode (hereinafter referred to as LD) consuming less electricity and having a longer service life and smaller size compared with the fluorescent light and the like have begun to be used as a light source for a surface illumination device such as a liquid crystal display backlight device.

For example, Patent Document 1 listed below describes an edge light type lighting device using an LED. The lighting device includes the LED, a light guide plate comparable in size to a post card and having a light guide portion for light from the LED formed as a flat surface, and a reflecting mirror that reflects light from the LED, and is configured in such a manner that the LED is mounted on the flat surface of the light guide plate and covered by the reflecting mirror. Patent Document 2 listed below describes a lighting device in which light from an LED is guided to a light guide plate through a light source rod including a prism array. Patent Document 3 listed below describes a cash register guide lamp in which a plurality of LEDs are disposed at equal intervals on a light input surface of a light guide body, light from the LEDs is irregularly reflected by a reflector body, and the diffused light makes a light output surface of the light guide body emit surface light to illuminate a display body opposed to the light output surface of the light guide body.

While the lighting devices described above are of the edge light type, a direct type lighting device is also known. For example, Patent Document 4 listed below describes a surface light emitting device in which an LED is provided with a light controller that controls light from the LED so that surface light can be obtained. Patent Document 5 listed below describes a surface lighting light source device and a surface illumination device using the surface lighting light source device. The surface lighting light source device includes: an LED; a box-shaped casing including a bottom surface portion in which the LED is mounted at the center portion and side surface portions standing from a periphery of the bottom surface portion, and being provided with an opening formed on a side opposite to the bottom surface portion; and an optical reflector plate that covers the opening and substantially uniformizes the light from the LED. The surface illumination device uses the plurality of surface lighting light source devices that are connected to each other.

PRIOR ART DOCUMENTS

Patent Documents

Patent Document 1: Japanese Patent Application Publication No. 2005-149848 (paragraph [0012] and FIG. 1)
Patent Document 2: Japanese Patent Application Publication No. 2001-236811 (paragraphs [0012] to [0014] and FIG. 1)
Patent Document 3: Japanese Patent Application Publication No. 2005-99406 (paragraphs [0016] and [0017] and FIG. 3)
Patent Document 4: Japanese Patent Application Publication No. 2004-6317 (paragraphs [0020] to [0026] and FIG. 1)
Patent Document 5: Japanese Patent Application Publication No. 2008-27886 (paragraphs [0045] to [0048] and FIG. 1)

SUMMARY OF THE INVENTION

Problems to be Solved by the Invention

In all of the edge light type lighting devices in Patent Documents 1 to 3 described above, one of or a plurality of LEDs is disposed on one or all sides of the rectangular light guide plate. Thus, uniform illumination light can be obtained from a light guide surface. These lighting devices, however, require the light guide plate that is relatively expensive and has a predetermined thickness and size and thus are difficult to be formed with a larger size. For example, the lighting device in Patent Document 1 described above uses a glass or acrylic plate comparative in size to a post card and thus is difficult to be formed with a size larger than that. Providing the larger size by all means requires a large light guide plate. In addition, a plurality of light emitting diodes are required as in the lighting device in Patent Document 3 described above and the plurality of light emitting diodes need to be disposed on light receiving surfaces on all sides of the light guide plate. Thus, the weight of the lighting device is increased, the number of parts is increased to make the assembling cumbersome, and further a cost is increased. Furthermore, when such a large light guide plate is used, a light path between the light source and a light emitting surface is long and thus, light is largely attenuated. Therefore, uniform illumination light is difficult to obtain and illumination light with high intensity is also difficult to obtain. These edge light type lighting devices each use the light guide plate and light sources are disposed around the light guide plate. Thus, the edge light type lighting device is suitable as a small lighting device but the size thereof is hard to increase. In contrast, the direct type surface illumination devices in Patent Documents 4 and 5 use no light guide plate and thus can have a light weight. Still, a plurality of light source devices need to be arranged in matrix to obtain illumination light with a large area and thus has a problem with the high cost.

Thus, the present invention is made to solve the problems of the conventional techniques, and an object of the present invention is to provide a surface illumination method of converting light from a point light source into surface light with a large area and radiating the surface light.

Another object of the resent invention is to provide a surface illumination device that can obtain uniform surface illumination light with a large area without using a light guide plate that is an essential element in the conventional techniques even when a point light source having high directionality is used as a light source.

Means for Solving the Problems

The object is achievable with the following structures.

A surface illumination method using a point light source that uses the point light source having high directionality, a linear light conversion unit that converts light from the point light source into linear light, a linear light diffusion unit that diffuses the linear light, and a surface lighting unit that is irradiated with diffused light and outputs surface illumination light, the method includes: converting the light from the point light source into the linear light by the linear light conversion unit; diffusing the linear light obtained by the conversion in a predetermined direction by the linear light diffusion unit; and radiating the diffused light on the surface lighting unit to be converted into surface light and radiating the surface light.

In the surface illumination method of the present invention, the point light source may be a light emitting diode or a laser diode.

A linear light source device of the present invention for achieving the object includes a point light source having high directionality and a casing that accommodates therein the point light source. The casing is formed of a box-shaped body having a thin and long bottom plate in which the point light source is provided at a substantially center portion, side plates standing to a predetermined height from a periphery of the bottom plate, a side defining an opening provided facing the bottom plate, and an inner wall surface that includes a reflective surface, the opening being covered by an optical reflector plate provided with a radiation pattern through which the light from the point light source is output as linear light.

In the linear light source device of the present invention, it is preferable that the casing be formed of a long cylindrical body having a predetermined diameter and an inner wall surface formed of a reflective surface, the point light source be fixed at a substantially center portion of the cylindrical body, and a slit be formed, on a ceiling portion substantially right above the point light source, through which the linear light is emitted and extending in a longitudinal direction passing through the right above ceiling point.

In the linear light source device of the present invention, the point light source may be a light emitting diode or a laser diode.

In the linear light source device of the present invention, it is preferable that the casing include any one of a reflective material made of a laminated body of ultrafinely foamed light reflector agent and aluminum metal, a reflective material having a reflective layer including polytetrafluoroethylene on a surface, and a reflective material having a reflective layer including barium sulfate on a surface.

A surface illumination device of the present invention for achieving the object includes: a point light source having high directionality; a linear light conversion device that converts light from the point light source into linear light; a linear light diffusion device that diffuses the linear light from the linear light conversion device; and a surface illumination light emitting member that is irradiated with diffused light from the linear light diffusion device and outputs surface light.

In the surface illumination device of the present invention, the point light source may be a light emitting diode or a laser diode.

In the surface illumination device of the present invention, it is preferable that the linear light conversion device include a casing that accommodates therein the point light source, the casing be formed of a box-shaped body having a thin and long bottom plate in which the point light source is mounted at a substantially center portion, side plates standing to a predetermined height from a periphery of the bottom plate, a side defining an opening provided facing the bottom plate, and an inner wall surface that includes a reflective surface, the opening being covered by an optical reflector plate provided with a radiation pattern through which light from the point light source is output as linear light, the linear light diffusion device include a space having a size large enough to accommodate the linear light conversion device and a diffusion member on an outer wall surface diffusing the linear light from the linear light conversion device in a predetermined direction, the surface illumination light emitting member be formed of a diffusion plate that is irradiated with the diffused light from the linear light diffusion device and outputs surface light.

In the surface illumination device of the present invention, it is preferable that the diffusion member be provided with a linear light diffusion pattern with which a portion irradiated with radiated light radiated with an angle θ of 60 degrees between a center light axis of the linear light and the center light axis has a high light reflectance and low light transmittance and a portion farther from the 60-degree angle has a lower light reflectance and higher light transmittance.

Effect of the Invention

By the surface illumination method of the present invention, the point light from the point light source having high directionality can be converted into the surface light with a large area to be illuminated.

With the linear light source device according to the present invention, the linear light source device that converts the point light from the point light source into the linear light can be obtained.

The linear light source device according to the present invention can be used for a germicidal lamp for water, curing an adhesive resin, a backlight of a light emitting liquid crustal display, and the like.

In the surface illumination device according to the present invention, the point light from the point light source is converted into the linear light, the linear light obtained by the conversion is diffused in a predetermined direction, and thus surface illumination light with a large area can be obtained from the surface illumination light emitting member.

In the surface illumination device according to the present invention, the diffusion plate is irradiated with the linear light output from the linear light conversion device by uniform light intensity through the predetermined linear light diffusion pattern.

The surface illumination method, the linear light source device, and the surface illumination device according to the present invention do not form a bright spot at the center portion nor conversely make a portion right above the point light source having high directionality dark even when the point light source having high directionality such as the LED or the LD is used, and thus uniform illumination light can be obtained.

BRIEF DESCRIPTION OF THE DRAWINGS

FIG. 2A is an external perspective view of a linear light conversion device in FIG. 1 and FIG. 2B is an exploded perspective view of the linear light conversion device in FIG. 2A.

BEST MODE(S) FOR CARRYING OUT THE INVENTION

Embodiments of the present invention will be described below. It should be noted that the embodiments described below exemplify a surface illumination method using a point light source, a light source device, and a surface illumination device using the light source device for embodying the technical idea of the present invention and thus are not intended to limit the present invention to the embodiments. The present invention can be equally applied to other embodiments included in a scope of claims. In the embodiments, a linear light conversion device, a linear light diffusion device, and a surface illumination device include a single linear light conversion device (light source device). Alternatively, the linear light conversion device, the linear light diffusion device, and the surface illumination device may include a plurality of linear conversion devices connected in tandem in a longitudinal direction.

Figure 1:
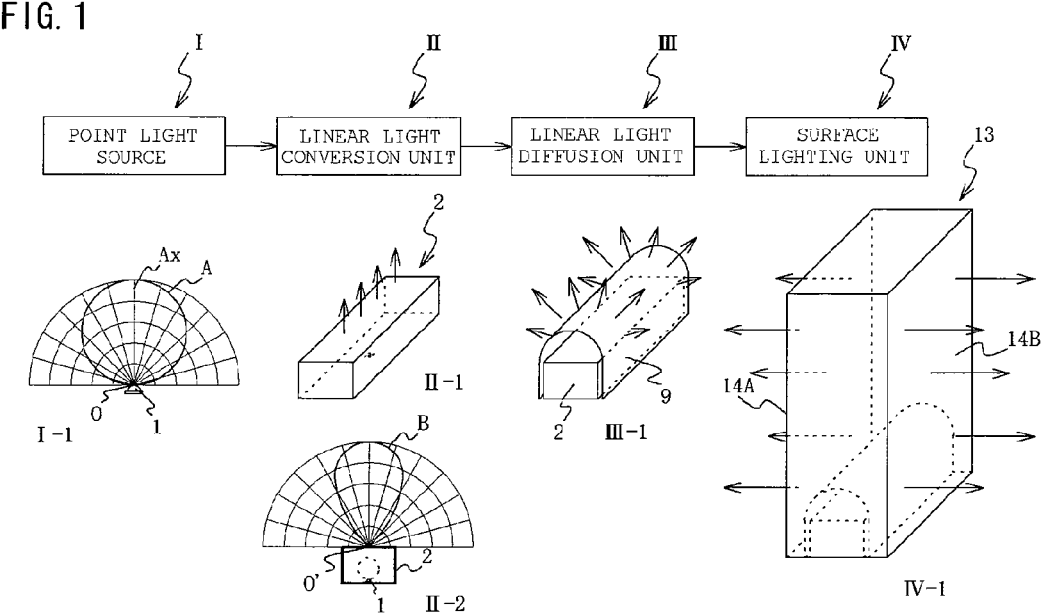
FIG. 1 is a schematic explanatory diagram for explaining a surface illumination method using a point light source according to a first embodiment of the present invention.

A surface illumination method using a point light source according to a first embodiment of the present invention will be described with reference to FIG. 1. FIG. 1 is a schematic explanatory diagram for explaining the surface illumination method using the point light source according to the first embodiment of the present invention.

This surface illumination method is a method of converting light from the point light source into linear light, converting the linear light obtained by the conversion into surface light, and radiating the surface light. Specifically, as illustrated in FIG. 1, the surface illumination method uses a point light source I having high directionality, a linear light conversion unit II that converts the light from the point light source into the linear light, a linear light diffusion unit III that diffuses the linear light, and a surface lighting unit IV that is irradiated with the diffused light and outputs the surface illumination light to convert the light from the point light source I, i.e., point light, into the linear light by the linear light conversion unit II, diffuse the linear light obtained by the conversion in a predetermined direction by the linear light diffusion unit III, and radiate the diffused light on the surface lighting unit IV and illuminate the surface light. Concrete examples of the linear light conversion unit, the linear light diffusion unit, and the surface lighting unit used in the surface illumination method will be described below.

A point light source 1 uses a single LED or an LED including a group of a plurality of LED elements (hereinafter, these are collectively referred to as LED) or an LD. The LED is not limited to those emitting light's three primary colors of R, G, and B. An LED emitting other colors may be used. In addition, an LED or an LD provided with a lens may be used. In the embodiments, an example where the LED is used will be described.

As depicted in FIG. 1, the LED 1 has substantially spherical light distribution characteristics that light is radiated in 360 degrees from a light emission point or a light emission surface of the LED 1 and converges at a point apart from the light emission point or the light emission surface. Specifically, as depicted in I-1 in FIG. 1, light from the LED 1 has a light distribution curve denoted by a reference symbol A in a range that is defined by: the light emitting center point (surface) 0 of the LED 1; a predetermined distance apart from the light emitting point (surface) 0 in a horizontal direction; a vertical line of 0 degree (0°) passing through the center point; and space specified with angle of 0° to 90° for the perpendicular line. While the light distribution curve A will be drawn as a ball shaped curve extending in a radiation direction, i.e., 360 degrees, around the light emission center point (surface) 0, the light passing through a light axis Ax at a directivity angle of 0 degree has the highest intensity.

The LED 1 is point light having the light distribution characteristics as depicted in I-1 in FIG. 1. Thus, when the LED 1 is directly used for illumination light, a range that can be illuminated is extremely narrow and surface illumination light with a large area cannot be obtained. Thus, before obtaining the surface illumination light with a large area, the point light from the LED 1 is converted into narrow and long linear light. The conversion into the linear light is performed by using the liner light conversion unit II, specifically a linear light conversion device 2 as illustrated in FIG. 2.

The linear light conversion device will be described with reference to FIG. 2. FIG. 2A is an external perspective view of the linear light conversion device and FIG. 2B is an exploded perspective view of the linear light conversion device in FIG. 2A.

The linear light conversion device 2 includes: the LED 1; a box-shaped casing 3 including a thin bottom plate 3a in which the LED 1 is fixed at a substantially center portion and side plates 3b standing to a predetermined height from a periphery of the bottom plate 3a, and being provided with an opening 3o defined by top portions of the side plates 3b; and an optical reflector plate 4 covering the opening 3o. The LED 1 is fixed at the substantially center portion of the bottom plate 3a and the optical reflector plate 4 covers the opening 3o.

The bottom plate 3a of the casing 3 has a pair of opposing long sides and a pair of opposing short sides. For example, a length L1 of the long side and a length L2 of the short side are 200 mm and 10 mm, respectively. A height H of the side plate is 10 mm for example. An inner wall surface of the box-shaped casing 3 is formed of a reflective surface having a high reflectance. A mounting hole in which the LED 1 is mounted is formed at the substantially center portion of the bottom plate 3a. The LED 1 is fixed on a substrate having a predetermined size. The substrate is disposed on a back surface of the bottom plate in such a manner that a light emitting portion of the LED is exposed through the mounting hole. The casing 3 is formed of a reflector plate material, e.g., an ultrafinely foamed light reflector plate, with a high light reflectance, a low light transmittance, and a low light absorptivity. As the ultrafinely foamed light reflector plate, one having a reflectance of 98%, a light transmittance of 1%, and a light absorptivity of 1% is available and is preferably used. It is a matter of course that the casing is not limited to this material and a transparent substrate on which a reflective material is applied or printed may be used. For example, this may be formed by applying or screen printing a substance obtained by emulsifying particulates of titanium white, a substance obtained by emulsifying particulates of polytetrafluoroethylene, or the like.

As illustrated in FIG. 2, the optical reflector plate 4 is formed of a thin plate body having a sufficient size for covering the opening 3o of the casing 3 and is formed of a reflector plate having a high light reflectance, a low light transmittance, and a low light absorptivity. The material used therefor is preferably the same with that used for the casing. The optical reflector plate includes a pair of long sides 4a and 4b and a pair of short sides 4c and 4d. Lengths of the long side and the short side are the same with the lengths of the sides of the bottom plate 3a of the casing 3. On the optical reflector plate 4, a center reflection portion 5 is formed at the center portion and outer reflection portions 6 are formed respectively toward the short sides 4c and 4d on both ends from the center reflection portion. The center reflection portion 5 and the outer reflection portions 6 form a predetermined radiation pattern. The center reflection portion 5 is right above the LED 1 when the optical reflector plate 4 is mounted on the opening 3o of the casing 3 and includes a center reflection area 5a facing a portion vertically right above the light emitting portion of the LED and having a small area and center periphery reflection areas 5b apart from the center reflection area 5a for a predetermined distance and having a slightly larger area. Due to its light distribution characteristics, the LED 1 radiates light with the highest intensity to the center reflection area 5a and light with second highest intensity to the center periphery reflection areas 5b. Thus, such an adjustment is performed that the center reflection area 5a has the highest light reflectance and the lowest light transmittance and the center periphery reflection areas 5b have a slightly lower light reflectance and a slightly higher light transmittance. Since the center reflection area 5a has the highest light reflectance and the lowest light transmittance, this area can be prevented from being dark and generation of a bright illumination spot can be prevented as well.

The reflectance and the transmittance are adjusted in the processing of the reflector plate. For example, the thickness of the reflector plate at the center reflection area 5a is adjusted while the reflector plate at the center periphery reflection areas 5b is adjusted by being provided with a plurality of thin grooves (longitudinal groove, lateral groove, or ring-shaped half-cut groove) and the like.

The outer reflection areas 6 each include an intermediate outer reflection portion 6a and an outermost reflection portion 6b provided toward both short sides 4c and 4d from the center periphery reflection area 5b. The intermediate outer reflection portion 6a and the outermost reflection portion 6b include a plurality of slits and through holes having different opening areas. Specifically, the intermediate outer reflection portion 6a includes slits $6_1$ to $6_7$ in which one disposed farther from the center periphery reflection area 5b has a larger opening area. The outermost reflection portion 6b includes through holes $6_8$ to $6_{19}$ in which one disposed farther from the intermediate outer reflection portion 6a has a larger opening area.

In the outer reflection area 6, the plurality of slits and openings formed in the intermediate outer reflection portion 6a and the outermost reflection portion 6b have different opening areas. Specifically, the opening area becomes larger toward the outermost reflection portion 6b from the intermediate outer reflection portion 6a. Thus, the point light from the LED 1 can be substantially uniformly output as substantially linear light.

In the linear light conversion device 2, the LED 1 is mounted on the bottom plate 3a of the casing 3 and the opening 3o is covered by the optical reflector plate 4. Thus, the point light from the LED 1 is reflected once or multiply reflected between the inner wall surface of the casing 3 and the back surface of the optical reflector plate 4 (rear surface of the light output surface). As a result, the linear light with a predetermined width and length is radiated through the center reflection portion 5 and the outer reflection portions 6 of the optical reflector plate 4 (see II-1 in FIG. 1). For example, the width and the length of the linear light radiated from the surface of the optical reflector plate 4 are 0.1 to 10 mm and 200 mm, respectively.

As depicted in II-2 in FIG. 1, the light distribution characteristics of the linear light from the linear light conversion device 2 have a shape as if the ball shaped light distribution characteristics curve (see I-1 in FIG. 1) of the LED 1 is cut in near-vertical directions. Thus, the linear light conversion device 2 can convert the point light from the LED 1 into the linear light having a predetermined width and length.

The linear light conversion device 2, which is used as the linear light conversion unit that converts the point light from the LED 1 into the linear light in the description above, can radiate the linear light having a predetermined width and length and thus can also be used as a light source device. For example, the linear light conversion device 2 can be used as the light source device for a scanner.

While an ultrafinely foamed reflector plate material is used as a material for the optical reflector plate, the material is not limited thereto and a transparent substrate on which a reflective material is applied or printed at a portion excluding the opening may also be used. For example, this is formed by applying or screen printing a substance obtained by emulsifying particulates of titanium white, or a substance obtained by emulsifying particulates of polytetrafluoroethylene.

In the optical reflector plate 4, the radiation pattern is formed by providing the center reflection portion 5 including the center reflection area 5a and the center periphery reflection areas 5b as well as the outer reflection potions 6. The structure is not limited to this and may be changed.

Modifications of the optical reflector plate having different radiation patterns will be described with reference to FIG. 3 and FIG. 4. FIG. 3A to FIG. 3C are plan views of the modifications of the optical reflector plates.

Figure 3A:
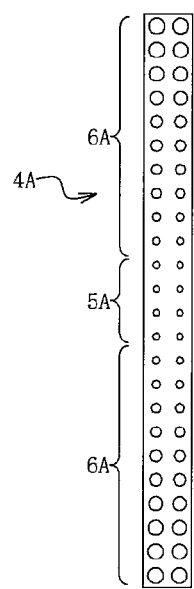
FIG. 3 illustrates plan views of modifications of an optical reflector plate forming the linear light conversion device in FIG. 2.
Figure 3B:
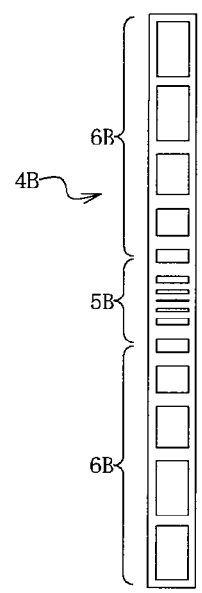
Figure 3C:
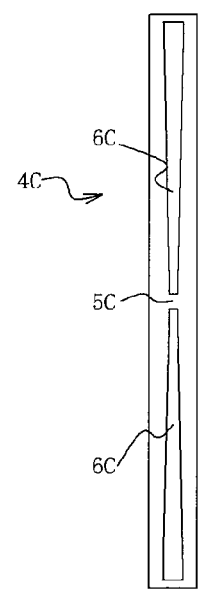

An optical reflector plate 4A includes a center reflection portion 5A at its center portion and outer reflection portions 6A respectively extending towards the short sides 4c and 4d at both ends from the center reflection portion (see FIG. 3A). The center reflection portion 5A includes a plurality of micropores so as to reflect the LED light with a high reflectance and have a low light transmittance. The outer reflection portion 6A includes through holes having openings with which the outer reflection portion 6A has reflectance gradually reduced and transmittance gradually increased, as it gets farther from the side center reflection portion.

An optical reflector 4B includes a center reflection portion 5B and outer reflection portions 6B each having slits. The slits have different areas to have a predetermined aperture ratio (see FIG. 3B). In an optical reflector 4C, a center reflection portion 5C includes no slit while outer reflection portions 6C each includes a relatively long slit with an opening area increased as it extends in a longitudinal direction (see FIG. 3C).

Figure 4A:
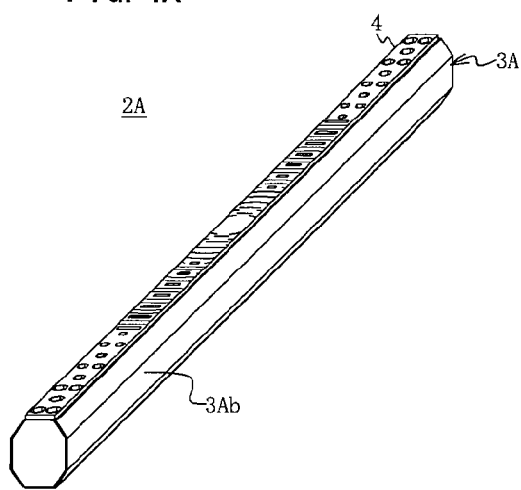
FIG. 4A and FIG. 4B are perspective views of modifications of the linear light conversion device in FIG. 1.
Figure 4B:
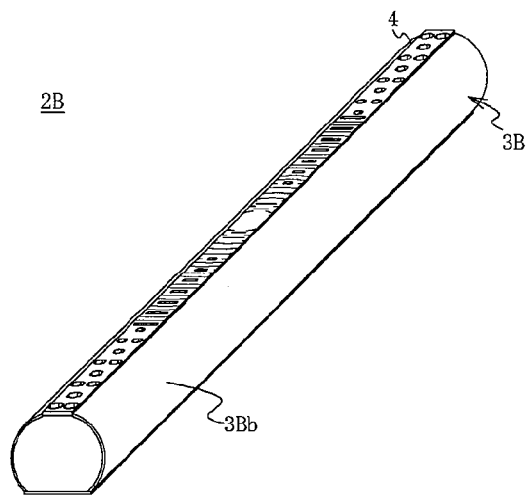
Figure 5A:
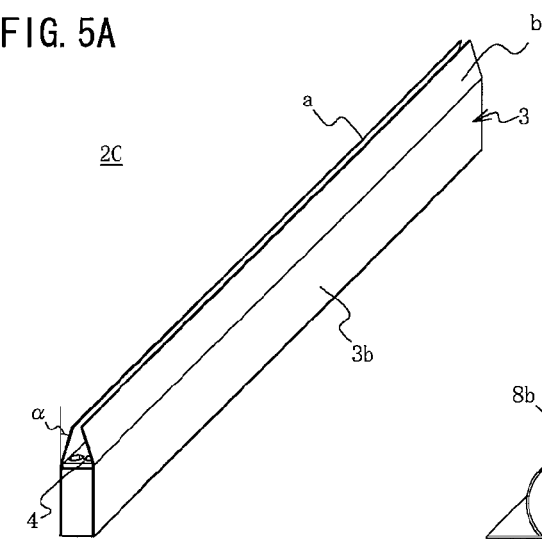
FIG. 5A and FIG. 5B are perspective views of other modifications of the linear light conversion device in FIG. 1.
Figure 5B:
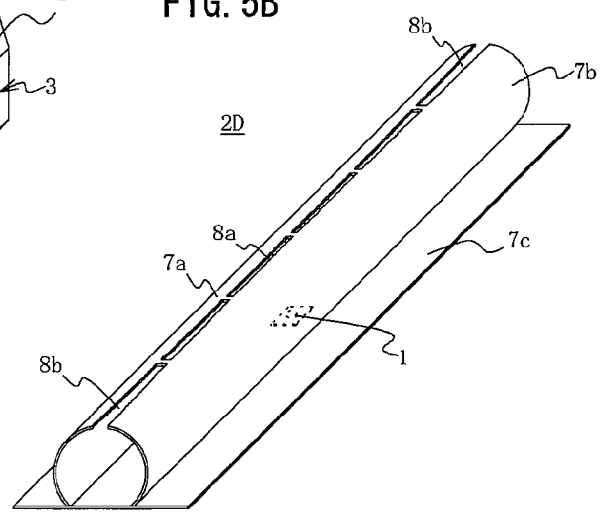

Other linear light conversion devices will be described with reference to FIG. 4 and FIG. 5. FIG. 4A, FIG. 4B, FIG. 5A, and FIG. 5B are perspective views of modifications of the linear light conversion device.

The shape of the casing 3 in the linear light conversion device 2 is not limited to a cuboid and may be shapes illustrated in FIG. 4. Specifically, in a linear light conversion device 2A, side plates 3Ab of a casing 3A form a polygonal columnar shape, and in a linear light conversion device 2B, a side plate 3Bb of a casing 3B forms a cylindrical shape. The shape of the casing is not limited those illustrated in the figures and may be of any shape as long as it is square columnar or cylindrical shape.

In a linear light conversion device 2C, a pair of light convergence reflector plates a and b inclined by a predetermined angle α and opposed to each other with a predetermined distance provided between top portions stand from upper edges of opposing side plates 3b. The distance is 0.1 to 2 mm for example. The light convergence reflector plates are preferably made of a material same as that of the optical reflector plate.

Even when relatively thick linear light having a width of about 5 mm to 10 mm is emitted from the optical reflector plate 4, the linear light conversion device 2C can convert the linear light into thin linear light having a width of about 0.1 to 2 mm.

In a linear light conversion device 2D, a casing denoted by reference numerals 7a and 7b forming a long cylindrical body having a predetermined inner diameter and having an inner wall surface formed of a reflective surface stand on a bottom portion 7c on the casing. Thus, in this casing, the side surface portions and the optical reflector are integrally formed. The point light source 1 is fixed in a substantially center portion of the bottom portion 7c. Slits 8 through which linear light is output is formed in a longitudinal direction passing through the ceiling point substantially right above the point light source 1. A center portion 8a of the slits is narrow, and outer potions 8b of the slits are widened as it gets farther from the center portion 8a.

Figure 6:
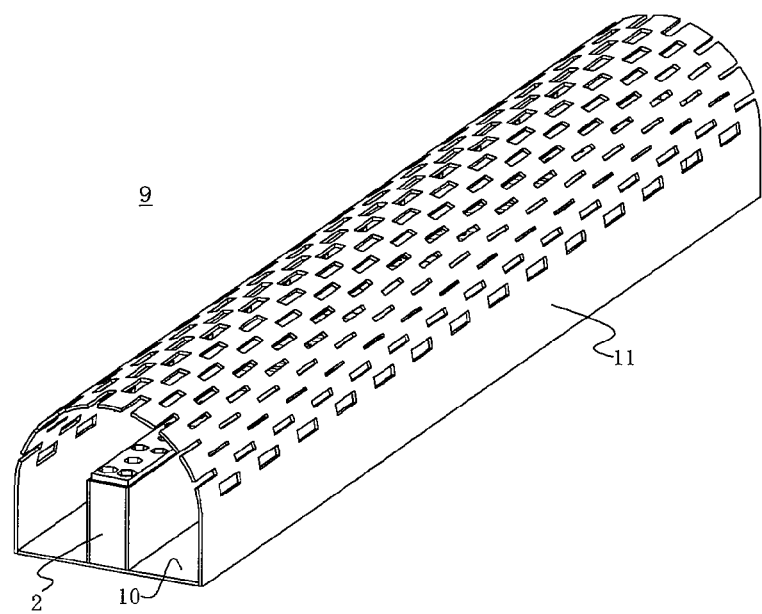
FIG. 6 is an external perspective view of the linear light conversion device in FIG. 1
Figure 7:
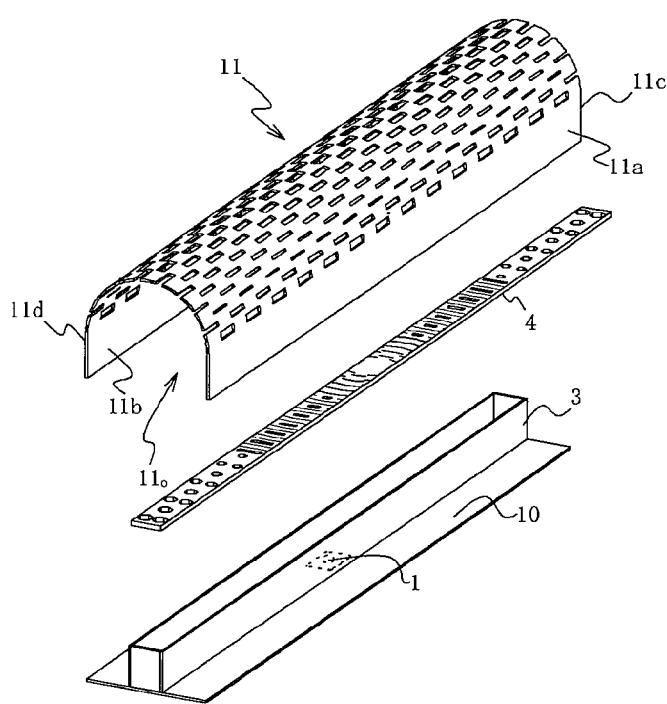
FIG. 7 is an exploded perspective view of the linear light conversion device in FIG. 6.

The linear light diffusion device will be described with reference to FIG. 6 and FIG. 7. FIG. 6 is an external perspective view of the linear light diffusion device, and FIG. 7 is an exploded perspective view of the linear light diffusion device in FIG. 6. As illustrated in III-1 in FIG. 1 and FIG. 6, the linear light diffusion unit III is formed of a linear light diffusion device 9 that covers the linear light conversion device 2 and diffuses the linear light from the linear conversion device in a predetermined direction.

The linear light diffusion device 9 exerts an effect of controlling light distribution of light emitted from the linear light conversion device 2 so as to uniformly light both surfaces or one of the surfaces of an edge type surface illumination device incorporating the linear light diffusion device 9. The structure thereof will be described below. The linear light diffusion device 9 includes the thin rectangular fixing plate 10 on which the linear light conversion device 2 is fixed and a linear light diffusion member 11 curved into a semicircular shape or an arch shape from one of opposing side edges of the fixing plate 10 to the other side edge so as to have an inner space large enough to accommodate the linear light conversion device 2. The fixing plate 10 is formed of a plate body having a sufficient size to allow the linear light conversion device 2 to be placed and fixed thereon. Specifically, the fixing plate 10 is formed of a plate body having a length substantially the same as the length of the bottom plate of the linear light conversion device 2 and a width slightly larger than the width of the bottom plate of the linear light conversion device 2 and is formed of a reflector plate having a high light reflectance, a low light transmittance, and a low light absorptivity. A material to form the fixing plate 10 is preferably the same as that of the casing of the linear light conversion device.

Figure 8:
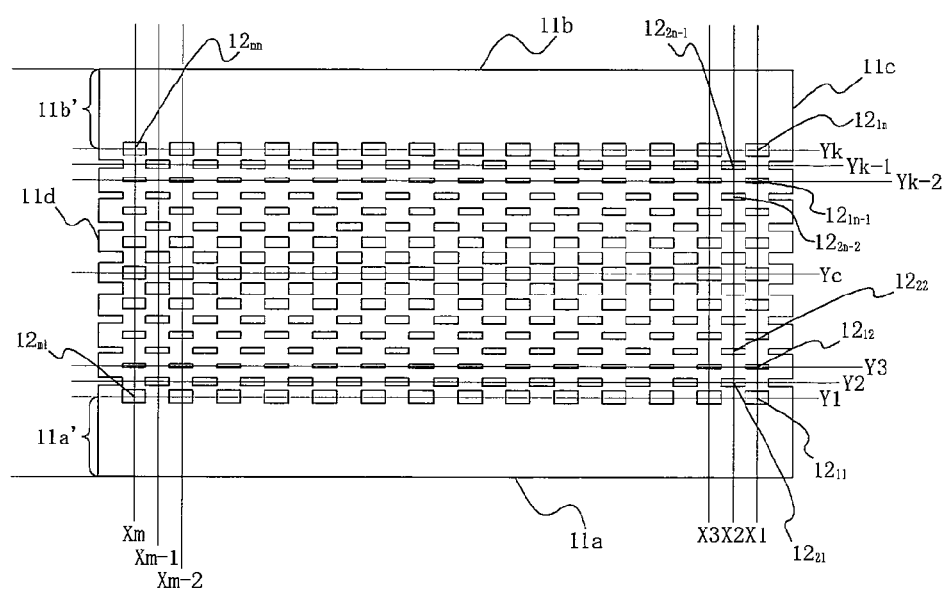
FIG. 8 is a plan view of a linear light diffusion member forming a linear light diffusion device in FIG. 6.

The linear light diffusion member 11 is formed of a reflector plate having a predetermined thickness, a length substantially the same as the length of the fixing plate 10, and a width slightly larger than the width of the fixing plate 10. Specifically, as illustrated in FIG. 7 and FIG. 8, the linear light diffusion member 11 has a rectangular shape including a pair of opposing long sides 11a and 11b having a length substantially the same as the length of the fixing plate 10 and a pair of opposing short sides 11c and 11d having a length longer than the width of the fixing plate. The linear light diffusion member 11 is fixed on the fixing plate 10 while being curved and thus is preferably formed of a flexible material. The linear light diffusion member 11 is fixed on the fixing plate 10 while being curved, accommodates the linear light conversion device 2 in an internal space 11o, and includes a plurality of through holes arranged in a predetermined pattern and having a predetermined opening areas for diffusing the linear light from the linear light conversion device in a predetermined direction.

The arrangement of the through holes provided in the linear light diffusion member 11 will be described with reference to FIG. 8. FIG. 8 is a plan view of the linear light diffusion member forming the linear light diffusion device in FIG. 6 illustrated in a flattened state.

The through holes are each formed of a hole having a rectangular opening and are formed at intersecting portions between virtual vertical lines X1, X2, X3 ... Xm-2, Xm-1, and Xm vertically extending from one of short sides, i.e. the short side 11c to the other short side, i.e. the short side 11d and drawn at substantially equal intervals and virtual horizontal lines Y1, Y2, Y3 ... Yk-2, Yk-1, and Yk horizontally extending from one of long sides, i.e. the long side 11a to the other long side, i.e. the long side 11b and drawn at substantially equal intervals. For example, the through holes $12_{1_1}$, $12_{1_2}$ ... $12_{1_{n-1}}$, and $12_{1_n}$ are formed at intersecting portions between the virtual vertical line X1 and odd number lines, e.g., Y1, Y3 ..., of the virtual horizontal lines, and the through holes $12_{2_1}$, $12_{2_2}$ ... $12_{2_{n-2}}$, and $12_{2_{n-1}}$ are formed at intersecting portions between the next virtual vertical line X2 and even number lines, e.g., Y2, Y4 ... Yk-1, of the virtual horizontal lines. The through holes $12_{m_1}$ to $12_{mn}$ are arranged in a similar manner. By being thus arranged, the through holes are arranged in a predetermined pattern to form a predetermined linear light diffusion pattern. The through holes are formed as holes having rectangular openings but the shape of the through holes is not limited to this and may be of any shape such as a circular shape and an elliptical shape.

The through holes arranged on each of the virtual horizontal lines Y1, Y2, Y3 ... Yk-2, Yk-1, and Yk have the same opening area while the through holes arranged on each of the virtual vertical lines X1, X2, X3 ... Xm-2, Xm-1, and Xm have different opening areas. The arrangement and the opening areas are for providing a function of irradiating a diffusion plate with the linear light radiated from the linear light conversion device 2 diffused uniformly as much as possible in consideration of the light distribution characteristics thereof so as to obtain uniform illumination light from the surface of the diffusion plate. Thus, the sizes and the pattern of the arrangement of the through holes are important. The sizes and the pattern of the arrangement of the through holes are determined with regard to the diffusion plate standing at a portion apart from the linear light conversion device 2 for a predetermined distance.

Figure 9:
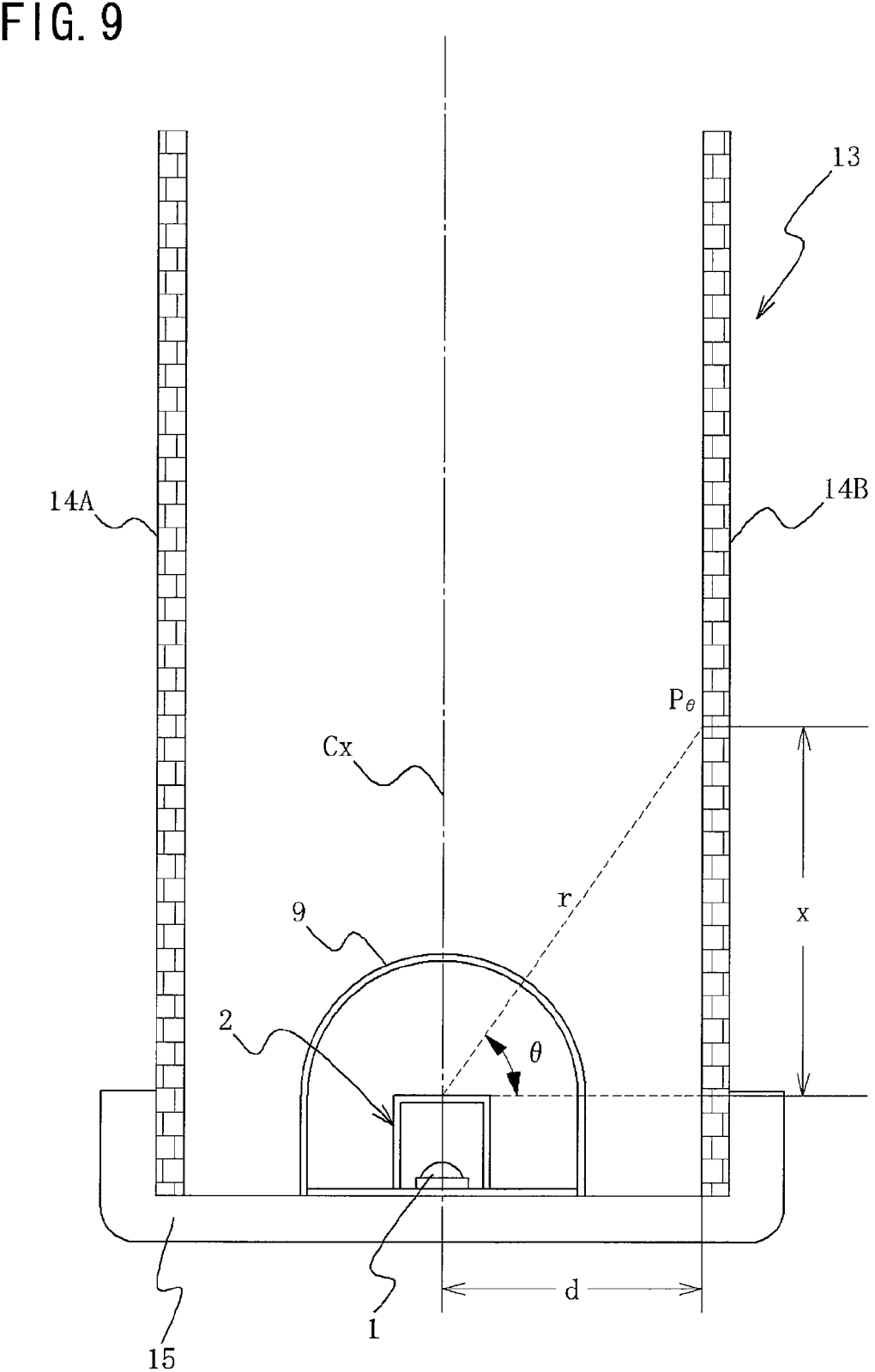
FIG. 9 is a partial cross sectional view of a surface illumination device incorporating the linear light diffusion device in FIG. 6.
Figure 10:
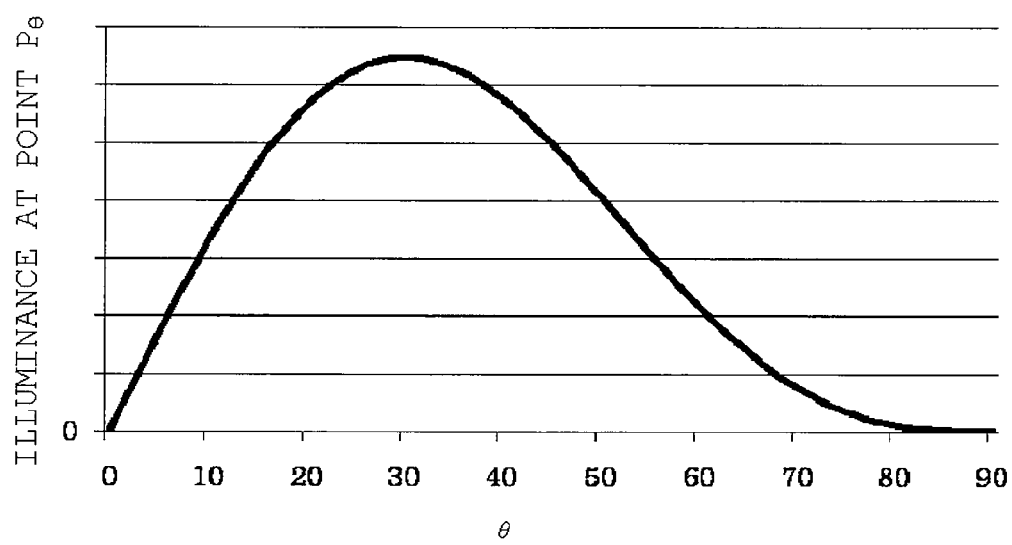
FIG. 10 illustrates an illumination curve of the surface illumination device in FIG. 9.

The sizes and the arrangement of the through holes will be described with reference to FIG. 8 to FIG. 10. FIG. 9 is a partial cross-sectional view of the surface illumination device incorporating the linear light diffusion device in FIG. 6. FIG. 10 is an illumination curve in a case where the linear light diffusion device is removed from the surface illumination device in FIG. 9. The surface lighting unit IV is formed of a surface illumination device 13 including a pair of diffusion plates 14A and 14B irradiated with the diffusion light from the linear light diffusion device and illuminates with the diffusion light as surface light.

The diffusion plates 14A and 14B stand in parallel with each other from both sides of the linear light conversion device 2 with a predetermined distance provided therebetween. The diffusion plates 14A and 14B are each formed of a rectangular plate having substantially the same length as the long side of the linear light conversion device 2 and a predetermined height (e.g., 200 mm). The linear light conversion device 2 is positioned substantially in the middle of the pair of opposing diffusion plates 14A and 14B. Thus, if an angle subtended by the optical reflector plate 4 of the linear light conversion device 2 to a predetermined position $P_\theta$ on one diffusion plate 14B is θp, a distance from a center line Cx of the optical reflector plate 4 to the diffusion plate 14B is d, a distance from the center line of the optical reflector plate 4 to the predetermined position $P_\theta$ is r, a height from the optical reflector plate 4 to the predetermined position $P_\theta$ is x, the following relationship holds true therebetween. Specifically, $$\cos \theta p = d/r$$

$$\cos(90°-\theta p) = x/r$$

$$r = \sqrt{(x^2+d^2)}.$$

An illuminance $E_\theta$ at the point $P_\theta$ is $$E_\theta = \cos \theta p \cdot \cos(90°-\theta p) \cdot K/r^2.$$

Thus, from the formulae above, $E_\theta$ can be represented as $$E_\theta = K \cdot d \cdot x/r^4.$$

Here, K is a proportional constant.
When $E_\theta$ is differentiated by x as a function of x, $$dE_\theta/dx = K \cdot d/r^4 + K \cdot d \cdot x \cdot (-4x)/r^6 = K \cdot d(d^2-3x^2)/r^6.$$

FIG. 10 illustrates a curve drawn based on the formulae. As illustrated in FIG. 10 and the formulae above, $E_\theta$ is largest when θp=30°, i.e., when an angle between the center light axis of the linear light and the center light axis is 60°.

Specifically, the sizes of the through holes formed on the linear light diffusion member 11 should be set in such a manner that a through hole at a position where the angle subtended by the optical reflector plate 4 to the predetermined position $P_\theta$ is 30° is the smallest. Uniform surface light can be obtained on the diffusion plate 14B by setting the sizes of the through holes formed on the linear light conversion device 2 based on the formulae above for other angles. The same applies to the diffusion plate 14A.

This relationship will be described with regard to the linear light diffusion member 11 illustrated in FIG. 8. The through holes disposed on the virtual horizontal lines Y3 and Yk-2 have the smallest opening area. The opening area of the through holes on a virtual horizontal line gradually increases as it gets farther from these virtual horizontal lines and the through holes on the center virtual vertical line Yc have the largest opening area.

In this surface illumination device, the point light from the LED 1 is converted into the linear light by the linear light conversion device, the linear light obtained by the conversion is diffused in a predetermined direction by the linear light diffusion device, and the diffused light is radiated on the diffusion plates and can be illuminated as the surface light.

Figure 11:
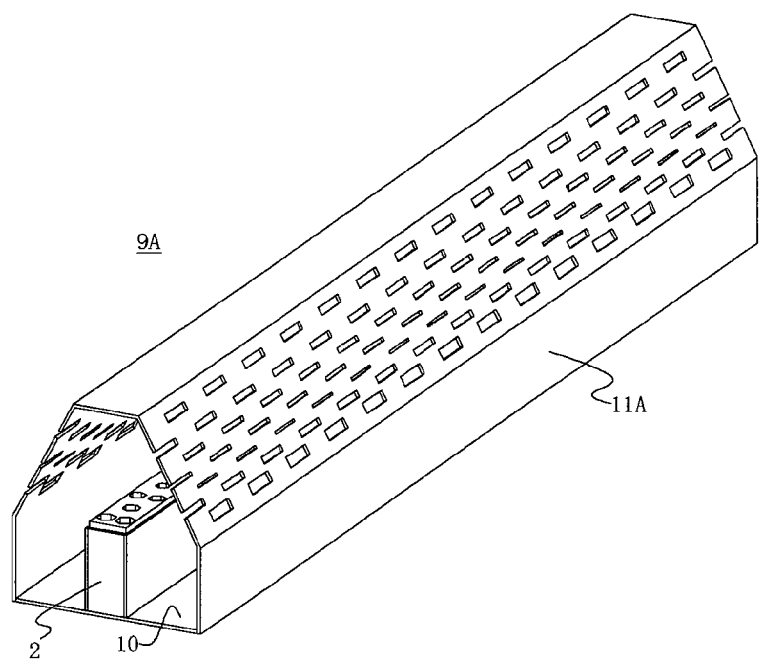
FIG. 11 is an external perspective view of a modification of the linear light diffusion device in FIG. 6.

In the linear light diffusion device 9, the through holes are also formed near the virtual horizontal line Yc of the linear light diffusion member 11. These through holes near the virtual horizontal line Yc may be omitted. A linear light diffusion member 11A in FIG. 11 has the through holes near the virtual horizontal line Yc omitted but other structure is the same as the linear light diffusion member 11. By omitting the through holes near the virtual horizontal line Yc, the light emitted in the direction of the center axis of the linear light is efficiently reflected and a larger amount of light passes through the through holes to be emitted to the diffusion plates 14A and 14B.

Figure 12:
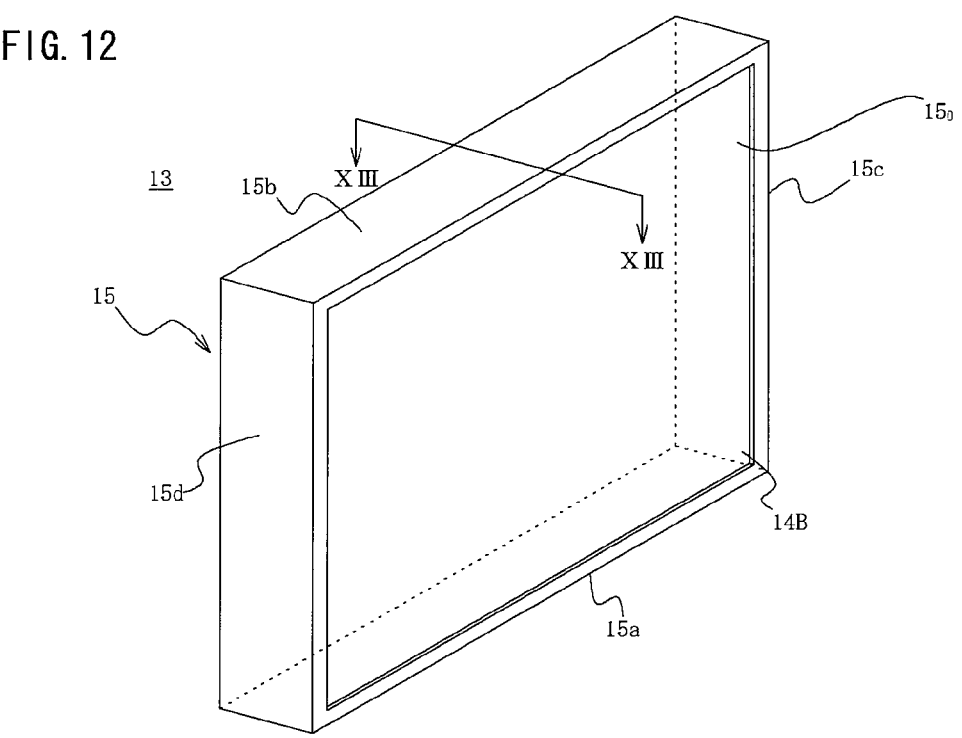
FIG. 12 is an external perspective view of a surface illumination device according to another embodiment of the present invention.
Figure 13:
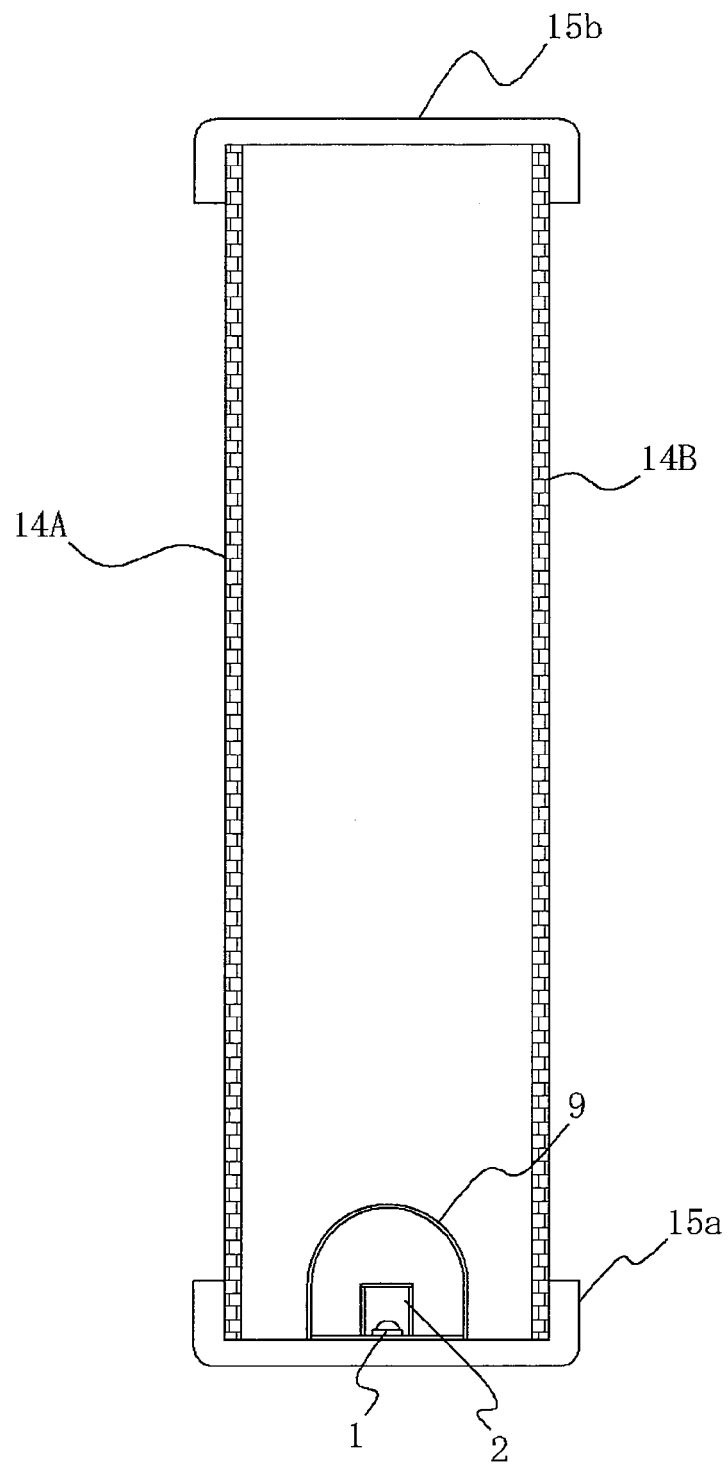
FIG. 13 is a cross-sectional view of the surface illumination device in FIG. 12 taken along the line XIII-XIII.

A surface illumination device according to another embodiment of the present invention will be described with reference to FIG. 12 and FIG. 13. FIG. 12 is an external perspective view of a surface illumination device according to another embodiment of the present invention. FIG. 13 is a cross-sectional view of the surface illumination device in FIG. 12 taken along the line XIII-XIII.

As illustrated in FIG. 12 and FIG. 13, a surface illumination device 13 has a structure in which a frame member 15 accommodates therein, an LED 1, a linear light conversion device 2 in which the LED 1 is mounted, a linear light diffusion device 9 by which the linear light from the linear light conversion device 2 is diffused and output in a predetermined direction, and a pair of diffusion plates 14A and 14B. The frame member 15 is formed of a frame body of a frame shape including a bottom frame 15a having a sufficient size for allowing the linear light diffusion device 9 and the pair of diffusion plates 14A and 14B to be accommodated, side frames 15c and 15d standing from both ends of the bottom frame and having a sufficient height for allowing the pair of diffusion plates 14A and 14B to be accommodated, and an upper frame 15b connecting between top portions of the side frames, and being provided with a space 15o inside. The frame member 15 is formed of a molded resin body.

In this surface illumination device 13, the point light from the LED 1 is converted into the linear light by the linear light conversion device 2, the linear light obtained by the conversion is diffused in a predetermined direction by the linear light diffusion device 9, and the diffused light is radiated on the pair of diffusion plates 14A and 14B and can be illuminated as the surface light. In this surface illumination device 13, the pair of diffusion plates 14A and 14B are used so that the illumination light can be output from both surfaces. Instead, while one of the diffusion plates remains unchanged, the other one may be replaced with a reflector plate so that the illumination light can be output from one of the surfaces.

The material for the casing of the linear light conversion device 2 is a material having a high light reflectance such as a reflective material formed of a laminated body of ultrafinely foamed light reflective material and aluminum metal, a reflective material having a reflective layer including polytetrafluoroethylene on a surface, and a reflective material having a reflective layer including barium sulfate on a surface. Thus, not only visible light but also near ultraviolet-light and infrared light can be uniformly reflected. The linear light conversion device 2 using this casing and an LED emitting near ultraviolet light can be used for a germicidal lamp for water, illumination for curing an adhesive resin, and the like. By incorporating the linear light conversion device 2, the surface illumination device 13 can be used for a backlight of a light emitting liquid crystal display in which a fluorescent material layer is used instead of a color filter layer as well.

EXPLANATION OF REFERENCE NUMERALS

I point light source
II linear light conversion unit
III linear light diffusion unit
IV surface light lighting unit
a, b light convergence reflector plate
1 point light source (LED)
2, 2A, 2B linear light conversion unit
3, 3A to 3D casing
3o opening
4, 4A to 4C optical reflector plate
5 center reflection portion
6 outer reflection portion
8 linear light diffusion device
10 fixing plate
11 linear light diffusion member
12 through hole
13 surface illumination device
14A, 14B diffusion plate
15 frame member

The invention claimed is:

1. A surface illumination method using a point light source that uses the point light source having high directionality, a linear light conversion unit that converts light from the point light source into linear light, a linear light diffusion unit that diffuses the linear light and has an inner space large enough to accommodate the linear light conversion unit, and a surface lighting unit that is irradiated with diffused light and outputs surface illumination light, the method comprising:
converting the light from the point light source into the linear light by the linear light conversion unit;
diffusing the linear light obtained by the conversion in a predetermined direction by the linear light diffusion unit; and
radiating the diffused light on the surface lighting unit to be converted into surface light and radiating the surface light.

2. The surface illumination method according to claim 1, wherein the point light source is a light emitting diode or a laser diode.

3. A linear light source device comprising:
a point light source having high directionality; and
a casing that accommodates therein the point light source, the casing being formed of a box-shaped body having: a thin and long bottom plate in which the point light source is provided at a substantially center portion; side plates standing to a predetermined height from a periphery of the bottom plate; a side defining an opening provided facing the bottom plate; and an inner wall surface that includes a reflective surface, the opening being covered by an optical reflector plate provided with a radiation pattern through which the light from the point light source is output as linear light.

4. The linear light source device according to claim 3, wherein the casing is formed of a long cylindrical body having a predetermined diameter and an inner wall surface formed of a reflective surface, the point light source is fixed at a substantially center portion of the cylindrical body, and a slit is formed, on a ceiling portion substantially right above the point light source, through which the linear light is emitted and extending in a longitudinal direction passing through the right above ceiling point.

5. The linear light source device according to claim 3, wherein the point light source is a light emitting diode or a laser diode.

6. The linear light source device according to claim 3, wherein the casing includes any one of a reflective material made of a laminated body of ultrafinely foamed light reflector agent and aluminum metal, a reflective material having a reflective layer including polytetrafluoroethylene on a surface, and a reflective material having a reflective layer including barium sulfate on a surface.

7. A surface illumination device comprising:
a point light source having high directionality;
a linear light conversion device that converts light from the point light source into linear light;
a linear light diffusion device that diffuses the linear light from the linear light conversion device;
a surface illumination light emitting member that is irradiated with diffused light from the linear light diffusion device and outputs surface light; and
a linear light diffusion device includes a space having a size large enough to accommodate the linear light conversion device and a diffusion member on an outer wall surface diffusing the linear light from the linear light conversion device in a predetermined direction.

8. The surface illumination device according to claim 7, wherein the point light source is a light emitting diode or a laser diode.

9. The surface illumination device according to claim 7, wherein the linear light conversion device includes a casing that accommodates therein the point light source,
the casing is formed of a box-shaped body having: a thin and long bottom plate in which the point light source is mounted at a substantially center portion; side plates standing to a predetermined height from a periphery of the bottom plate; a side defining an opening provided facing the bottom plate; and an inner wall surface formed of a reflective surface, the opening being covered by an optical reflector plate provided with a radiation pattern through which light from the point light source is output as linear light,
the linear light diffusion device includes a space having a size large enough to accommodate the linear light conversion device and a diffusion member on an outer wall surface diffusing the linear light from the linear light conversion device in a predetermined direction, and
the surface illumination light emitting member is formed of a diffusion plate that is irradiated with the diffused light from the linear light diffusion device and outputs surface light.

10. The surface illumination device according to claim 9, wherein the diffusion member is provided with a linear light diffusion pattern with which a portion irradiated with radiated light radiated with an angle B of 60 degrees between a center light axis of the linear light and the center light axis has a high light reflectance and low light transmittance and a portion farther from the 60-degree angle has a lower light reflectance and higher light transmittance.

* * * * *